(12) United States Patent
Thompson (10) Patent No.: US 6,971,503 B2
(45) Date of Patent: Dec. 6, 2005

(54) CONVEYOR BELT CLEANING APPARATUS (76) Inventor: Cynthia Thompson, 6195 Nagel St., La Mesa, CA (US) 91942

( * ) Notice: Subject to any disclaimer, the term of this patent is extended or adjusted under 35 U.S.C. 154(b) by 97 days.

(21) Appl. No.: 10/724,442

(22) Filed: Nov. 26, 2003

(65) Prior Publication Data

US 2005/0109580 A1    May 26, 2005

(51) Int. Cl.⁷ .............................................. B65G 45/00
(52) U.S. Cl. ...................... 198/494; 198/495; 198/496; 198/497
(58) Field of Search ................................ 198/493, 494, 198/495, 497; 134/144

(56) References Cited

U.S. PATENT DOCUMENTS

| | | |
|---|---|---|
| 3,815,728 A | 6/1974 | Vaughan |
| 3,998,321 A | 12/1976 | Schultz |
| 4,860,883 A | 8/1989 | Knaul et al. |
| 4,976,342 A | 12/1990 | Hwang |
| 5,117,967 A * | 6/1992 | Morrow et al. .............. 198/495 |
| 5,355,992 A | 10/1994 | Baig et al. |
| 5,358,094 A | 10/1994 | Molinaro et al. |
| 5,368,650 A * | 11/1994 | Tanaka et al. ................. 134/15 |
| 5,372,243 A * | 12/1994 | King ............................ 198/495 |
| 5,421,448 A * | 6/1995 | Falcioni ....................... 198/498 |
| 5,613,594 A | 3/1997 | Kootsouradis |
| 5,758,761 A * | 6/1998 | Selbertinger et al. ........ 198/495 |
| 6,051,076 A * | 4/2000 | Oechsle et al. ................ 134/15 |
| 6,135,267 A * | 10/2000 | Straub .......................... 198/495 |
| 6,206,175 B1 * | 3/2001 | Tschantz ...................... 198/493 |
| 6,305,184 B1 * | 10/2001 | Kuhl ............................. 62/380 |
| 6,364,959 B1 * | 4/2002 | Straub et al. ................... 134/9 |
| 6,651,803 B2 * | 11/2003 | Virippil et al. .............. 198/495 |
| 6,688,434 B2 * | 2/2004 | Johnson et al. ............. 184/15.3 |
| 2001/0023814 A1 | 9/2001 | Franzoni et al. |

* cited by examiner

Primary Examiner—Douglas Hess
(74) Attorney, Agent, or Firm—Gary L. Eastman (57) ABSTRACT A conveyor belt cleaning apparatus includes a debris-removal stage, a washing stage, a rinsing stage, and a water removal stage all positioned in a multi-chambered drawer with each of the four stages is provided with an isolated bin within that drawer. The various stages within the conveyor belt cleaning apparatus provide for the continuous or on-demand cleaning of a conveyor belt in order to remove any debris and fluids from the belt thereby providing a clean belt surface for use by the grocery store customer. The device may be installed as a new element in a check stand, or it may be retrofitted to an existing check stand.

18 Claims, 7 Drawing Sheets

PRIOR ART CHECKSTAND

CONVEYOR BELT CLEANING APPARATUS

FIELD OF THE INVENTION

The present invention relates generally to the field of food and product handling devices. The present invention is more particularly suited for the cleansing of continuous conveyor belt surfaces, and is specifically, though not exclusively, well suited for use in cleaning and disinfecting the contact surfaces of conveyor belt contained in a typical grocery store checkout counter.

BACKGROUND OF THE INVENTION

Over the past several decades, as people's lives have become more hectic, it has become more and more necessary to provide customers with quick, and efficient customer service. In no other industry is this more apparent than in the grocery industry. With the popular grocery store promotions claiming no more than three customers in a checkout line, it is important that the customers be moved through the checkout lines just as fast as possible.

In order to expedite the check-out process, a number of label and bar code scanning device have been implemented that can, with the swipe of a cashier's hand, read the label and determine the product category, description and price. In order to further expedite the checkout process, checkout stands have been equipped with various mechanisms for bringing the products to the cashier.

One of the first product handling devices that was introduced was the circular check stand. In a circular check stand, there is a circular-shaped table that rotates near the cashier. A customer approaches the check stand and places his groceries on the rotating table and the products rotate around for easy access by the cashier.

While the circular check stand was indeed an improvement over the prior methods of grocery handling, it nevertheless had its drawbacks. For instance, because the circular check stand had a circular table, it was either too big around to provide a sufficient number of check stands within a store, or it was too small and incapable of serving as a time-saving product handling device.

In light of the shortcomings of the circular check stand, a linear, conveyor-belt check stand was introduced. This conveyor-belt check stand was much more efficient in advancing groceries toward the cashier. More particularly, since the conveyor belt was a long device, ranging from a few to several feet long, it could provide an advancing conveyor surface much larger than its predecessor circular check stand. Further, the conveyor belt surface is a parallel surface, instead of the pie-shaped surface of the circular check stand, and would advance the groceries directly toward the cashier's label-scanning device. As a result of these various advantages, the linear conveyor-belt check stand has become the most widely used check stand in the grocery industry.

In a conveyor-belt type check stand, a synthetic conveyor belt, typically of rubber or plastic, is supported on each end by a roller. These rollers provide a tension between themselves to retain the conveyor belt in position, and is also equipped with a drive motor that rotates a roller, and advances the belt around the rollers.

In use, a customer approaches a check stand and places his groceries on the conveyor belt. Either by manual control or by an automated device, the rollers begin to rotate thereby advancing the surface of the conveyor belt containing the groceries toward the cashier. In some cases, the check stand is equipped with an optical beam that senses the presence of groceries at the cashier's position and slows or stops the rotation of the roller, thereby stopping the advancing of the groceries towards the cashier until those groceries closest to the cashier have been processed.

A typical conveyor-belt style check stand is shown and described in U.S. Pat. No. 5,358,094, which issued to Molinaro in 1994 for an invention entitled "Conveyor Belt With Advertisements" ("the '094 patent"). The check stand shown in the '094 patent includes a conveyor belt (ref. #16) formed into a continuous loop that constantly advances groceries toward or away from a cashier.

One of the many challenges for modern cashiers is the maintenance of the check stand. For example, because of the use of the precision bar-code scanning devices, it is necessary to keep the transparent surfaces adjacent the scanning device particularly clean in order to ensure a proper and expedient bar-code scan. Also, a cashier must also ensure that the conveyor belt is kept clean, and make sure that his customers have a clean place to set their groceries.

Modern grocery stores carry a wide variety of products, including fresh and frozen vegetables, fresh fish, poultry, and beef, along with all household cleaning solutions and chemicals, such as soaps and bleach. Despite significant improvements in product packaging it is a fact that many products still leak fluids. Whether its a leaky heat-shrink cellophane, a melting frozen vegetable, or a plastic bottle with a loose lid, it is commonplace for various fluids to be left on the conveyor belt of a check stand. When considering that this fluid may be from uncooked meat, poultry, fish, or perhaps a leaky bleach or lye bottle, it is clear that these fluid remnants can cause significant health and safety concerns to both the customer and the cashier.

Because of these concerns, it is routine for a cashier to have a bottle of cleaner and/or disinfectant at his station. Armed with a roll of paper towels, it is standard practice for the cashier to periodically pause and spray disinfectant on a smudge, smear or glob of unknown substance on the conveyor belt and wipe it clean with the paper towels.

Unfortunately, when there is a large line of anxious customers, or there are no more towels or disinfectant solution available to the cashier, it is possible that the conveyor belt is not cleaned often enough. This is particularly troubling when considering the types of fluids that may exist on the surface of a grocery store check stand—such as harsh chemicals like bleach and lye, and uncooked food drippings laced with bacteria such as *Escherichia coli* (*E-coli*), *Salmonella*, and assorted viruses and fungi.

In light of the above, it would be advantageous to provide a solution to the cashier's routine task of cleaning the check stand conveyor belt. It would also be advantageous to provide a cleaning device that automatically cleans the conveyor belt without any action by the cashier as he is often too busy or distracted to remember to do it. It is also advantageous to provide a device that may be incorporated into new check stands, as well as be easily retrofitted into existing check stands. And it would also be advantageous to provide a device that is easy to manufacture, easy to install, and easy to maintain, yet is still cost effective.

SUMMARY OF THE INVENTION

The present invention includes a conveyor belt cleaning apparatus for cleaning a continuous loop conveyor belt within a check stand. The conveyor belt cleaning apparatus includes a debris-removal stage, a washing stage, a rinsing stage, and a water removal, or drying, stage. The various stages within the conveyor belt cleaning apparatus provide for the continuous or on-demand cleaning of a conveyor belt in order to remove any debris and fluids from the belt thereby providing a clean belt surface for use by the grocery store customer.

The conveyor belt cleaning apparatus of the present invention may be installed as a new element in a check stand, or it may be retrofitted to an existing check stand. The apparatus includes a multi-chambered drawer and each of the four stages may be provided with an isolated bin within that drawer.

The debris-removal stage of the conveyor belt cleaning apparatus of the present invention includes one or more scraping devices, such as a squeegee-like surface. These scraping devices are designed to scrape food, fluids or other debris from the surface 116 of the conveyor belt. The dislodged debris falls into the corresponding bin for collection and is removed at a later time.

Also in the debris removal stage, a cleaning solution sprayer may be positioned to forcefully spray a cleaning solution onto the surface of the conveyor belt thereby further serving to remove debris from the belt. The sprayed cleaning fluid and any other debris may fall into the debris removal bin.

As the conveyor belt continuously advances, the substantially debris-free surface passes over a cleaning roller that dispenses a cleaning solution onto the surface of the belt. Excess cleaning solution falls it the corresponding cleaning roller bin, and may be re-used. An idler wheel is positioned adjacent the cleaning roller in order to maintain positive contact between the belt and the cleaning roller.

After the conveyor belt passes over the cleaning roller, the conveyor belt passes over the rinsing wheel which is intended to remove all excess cleaning fluid, along with any remaining bacteria and debris. As the rinsing wheel rolls along the conveyor belt, the fluid is pushed from the surface of the conveyor. The idler wheel may also serve to maintain positive contact between the rinsing wheel and the conveyor belt sufficient to rinse substantially all cleaning solution from the belt.

Following the rinsing wheel, a series of water removing squeegees are positioned in the final drying stage. These squeegees may have different shapes, however, importantly provide a contact force on the surface of the conveyor belt to squeegee water from its surface. Also in the drying stage, a fan may be provided to create an air flow over the surface of the belt thereby expediting the drying process to make sure that the surface of the conveyor belt is dry for use by a grocery store customer.

The drawer of the conveyor belt cleaning apparatus of the present invention may be easily removed from the check stand for servicing, and for draining and replacement of the cleaning fluids. Also, the drawer may be equipped with drain nozzles suitable for draining the used fluids from the conveyor belt cleaning apparatus without removal from the check stand. The conveyor belt cleaning apparatus may also be equipped with a fill nozzle to allow for the addition of the cleaning fluids to the cleaning stage bin.

BRIEF DESCRIPTION OF THE DRAWINGS

The novel features of the conveyor belt cleaning apparatus of the present invention, as well as the invention itself, both as to its structure and its operation, will be best understood from the accompanying drawings, taken in conjunction with the accompanying description, in which reference characters refer to similar parts, and in which.

DESCRIPTION OF THE PRIOR ART

Figure 1:
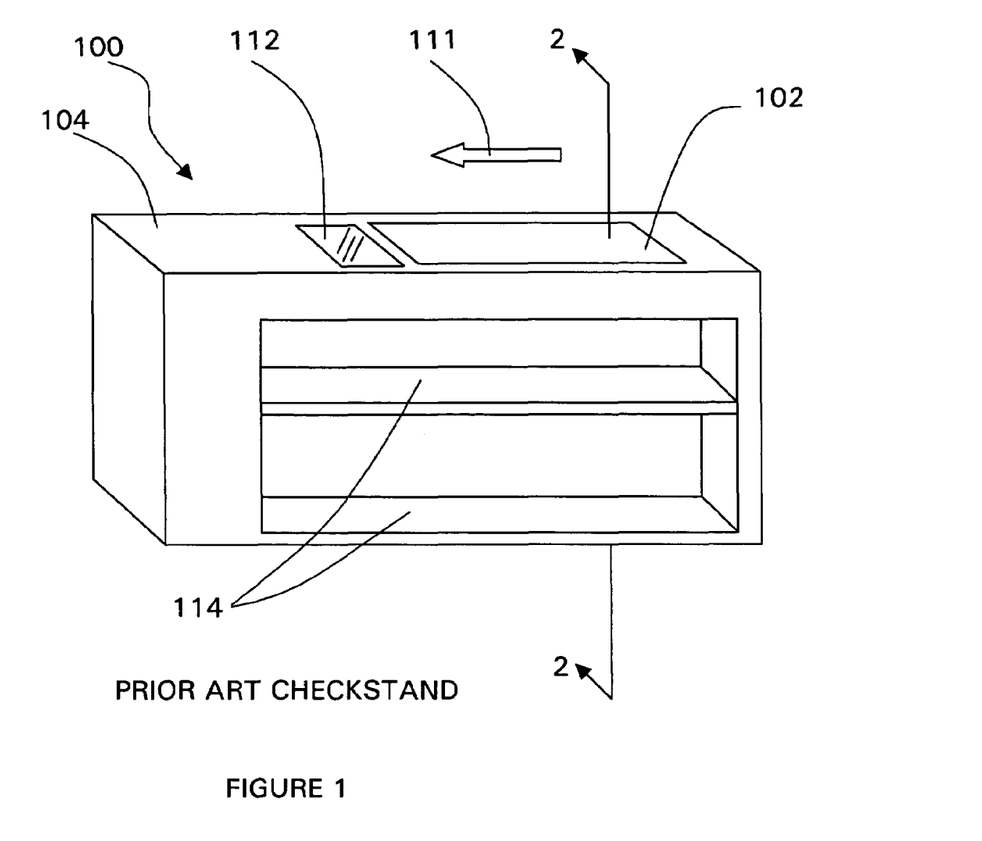
FIG. 1 is a perspective view of a PRIOR ART checkstand showing the positioning of the continuous loop conveyor belt intended to advance groceries toward a cashier for scanning by a laser scanning device.

Referring initially to FIG. 1, a typical PRIOR ART checkstand is shown and generally designated 100. Checkstand 100 includes a continuous loop conveyor belt 102 on the grocery surface 104 and continually rotates around a pair of drive wheels 108 (not shown this Figure) and is intended to advance groceries 115 in direction 111 toward a cashier for scanning by a laser scanning device 112. The checkstand 100 may be formed with one or more shelves 114 that provide storage for necessary items such as a spray bottle of cleaning solution, as well as provide access to the lower portion 116 of the continuous loop conveyor belt 102.

Figure 2:
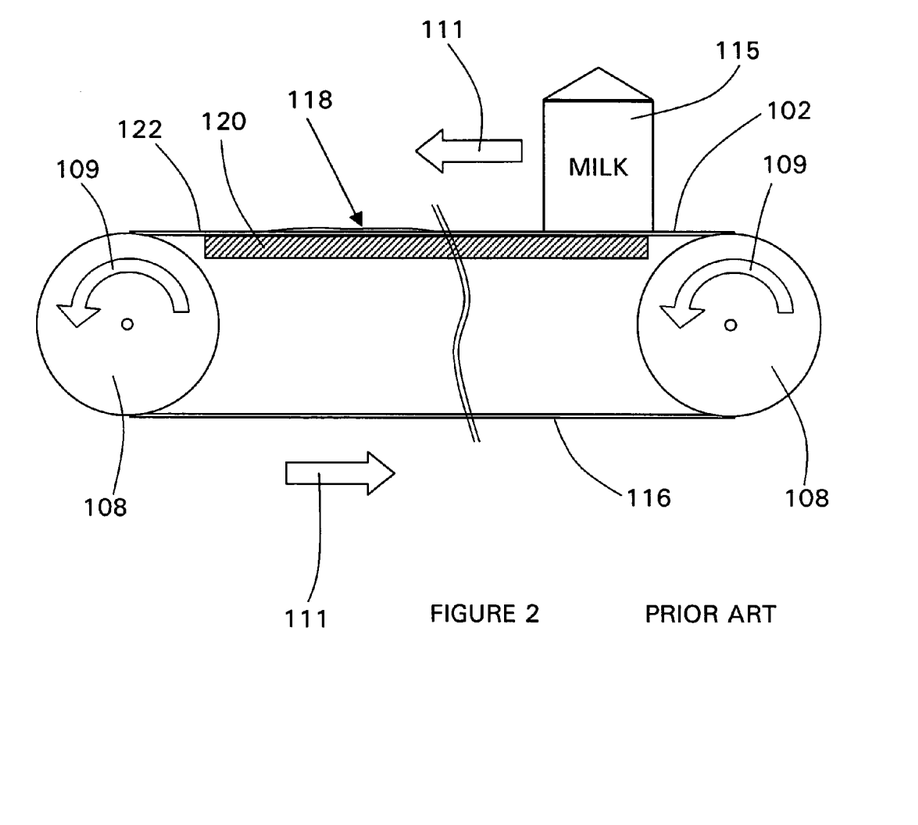
FIG. 2 is a cross-sectional drawings of the PRIOR ART conveyor assembly as taken along line 2—2 of FIG. 1, and showing the two main support wheels that provide the rotational force to advance the conveyor belt, as well as a typical grocery placed on the surface, just behind an unidentified and possibly hazardous fluid substance.

FIG. 2 is a cross-sectional drawings of the PRIOR ART conveyor assembly as taken along line 2—2 of FIG. 1, and shows the two main drive wheels 108 that provide the rotational force 109 to advance the conveyor belt 102 in direction 111, as well as a typical grocery 115 placed on the surface, just behind an unidentified and possibly hazardous fluid substance 118. As discussed more fully above, the presence of substance 118 on conveyor belt 102 poses a significant threat to the health and safety of grocery store customers as well as the cashiers assisting those customers.

Checkstand 100 includes a support panel 120 that is substantially parallel with the upper portion 122 of conveyor belt 102. Support panel 120 provides a weight-bearing surface for the conveyor belt to slide over while transporting the groceries 115 toward the cashier.

It is to be appreciated that the particular structure of a PRIOR ART checkstand 100 as presented herein is merely exemplary of the currently available checkstands. The particular construction, layout, or design aspects disclosed herein are not intended as a limitation as to the function or applicability of the conveyor belt cleaning apparatus of the present invention in any way.

DETAILED DESCRIPTION OF A PREFERRED EMBODIMENT

Figure 3:
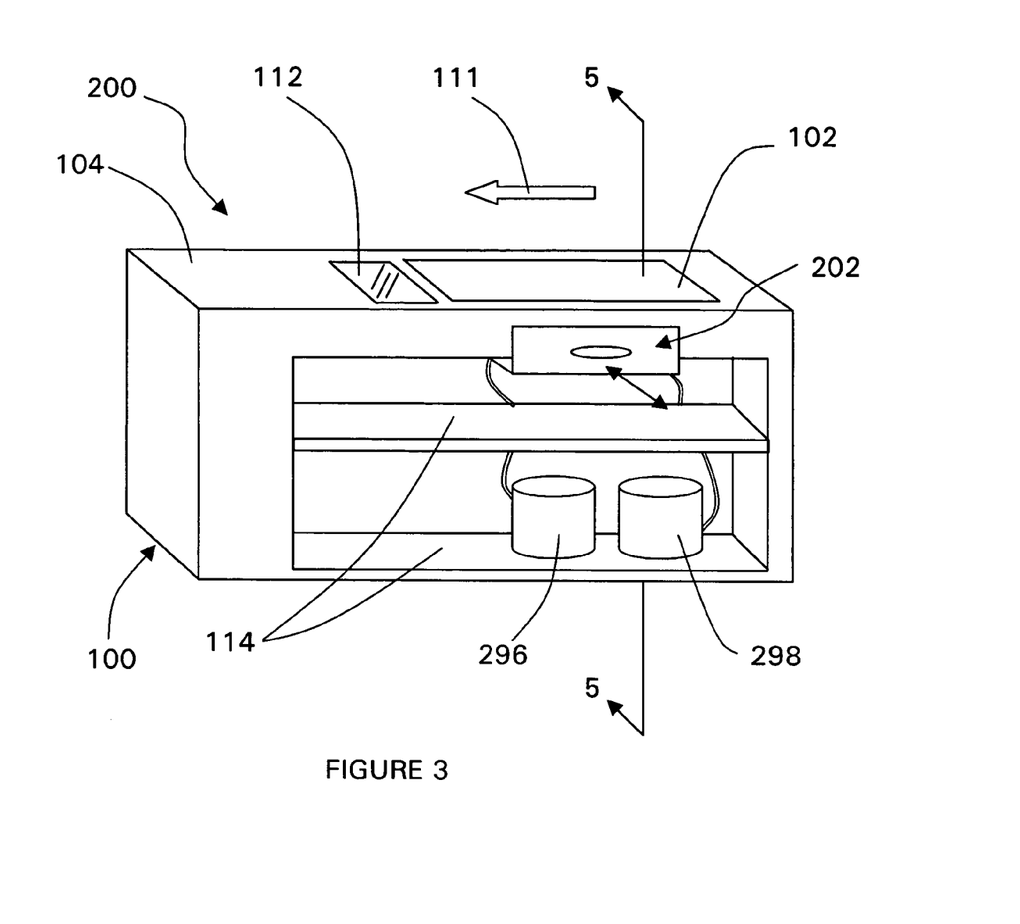
FIG. 3 is a perspective view of the conveyor belt cleaning apparatus of the present invention showing a removable drawer positioned adjacent a continuous loop conveyor belt and conveniently located for easy access by the cashier and showing fluid canisters to supply cleaning solution, and to receive used cleaning solution.

Referring now to FIG. 3, a checkstand 200 is presented having a conveyor belt cleaning apparatus of the present invention and is generally designated 202. As shown, the conveyor belt cleaning apparatus 202 is installed in position on a typical checkstand 200 in the location typically occupied by shelves 114. It is to be appreciated that a conveyor belt cleaning apparatus of the present invention may be installed as a new element in a check stand 200, or it may be retrofitted to an existing check stand 200. The conveyor belt cleaning apparatus 202 may be formed as a removable drawer-like device providing for the easy removal of the apparatus 202 for servicing, refilling and cleaning.

Figure 4:
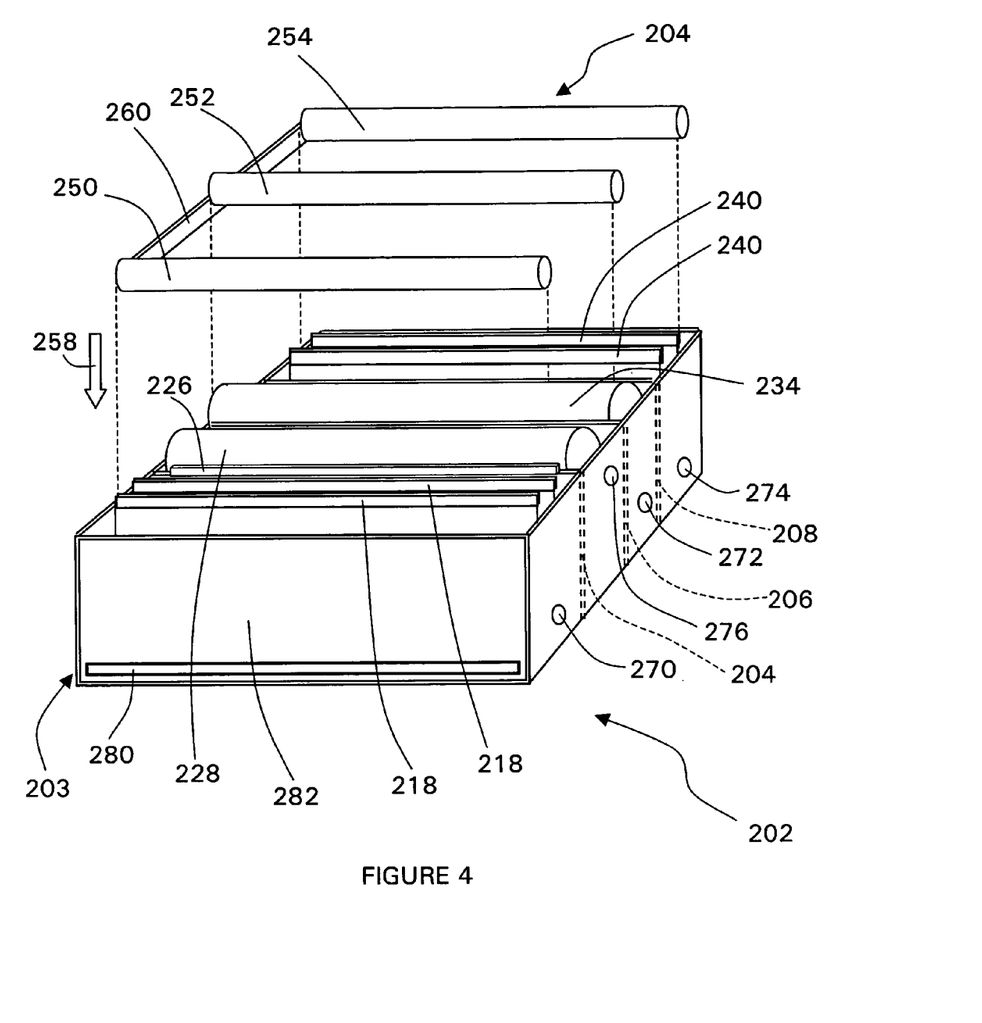
FIG. 4 is an exploded view of the conveyor belt cleaning apparatus of the present invention showing an idler wheel assembly positioned to capture the lower portion of a continuous conveyor belt in the apparatus to clean the belt as it passes between the idler wheels and the cleaning and rinsing rollers.

Referring now to FIG. 4, an exploded view of the conveyor belt cleaning apparatus 202 is shown and includes a drawer chassis 203 formed with a number of dividing walls 204, 206, and 208. Dividing walls 204, 206 and 208, in combination with chassis 203, form four (4) discrete sections within the conveyor belt cleaning apparatus 202. More specifically, walls 204, 206 and 208 form a debris-removal stage 210, a washing stage 212, a rinsing stage 214, and a water removal, or drying, stage 216, within the chassis 203. The various stages within the conveyor belt cleaning apparatus 202 provide for the continuous or on-demand cleaning of a conveyor belt 102 in order to remove any debris and fluids 118 from the belt thereby providing a clean belt surface for use by the grocery store customer.

Figure 5:
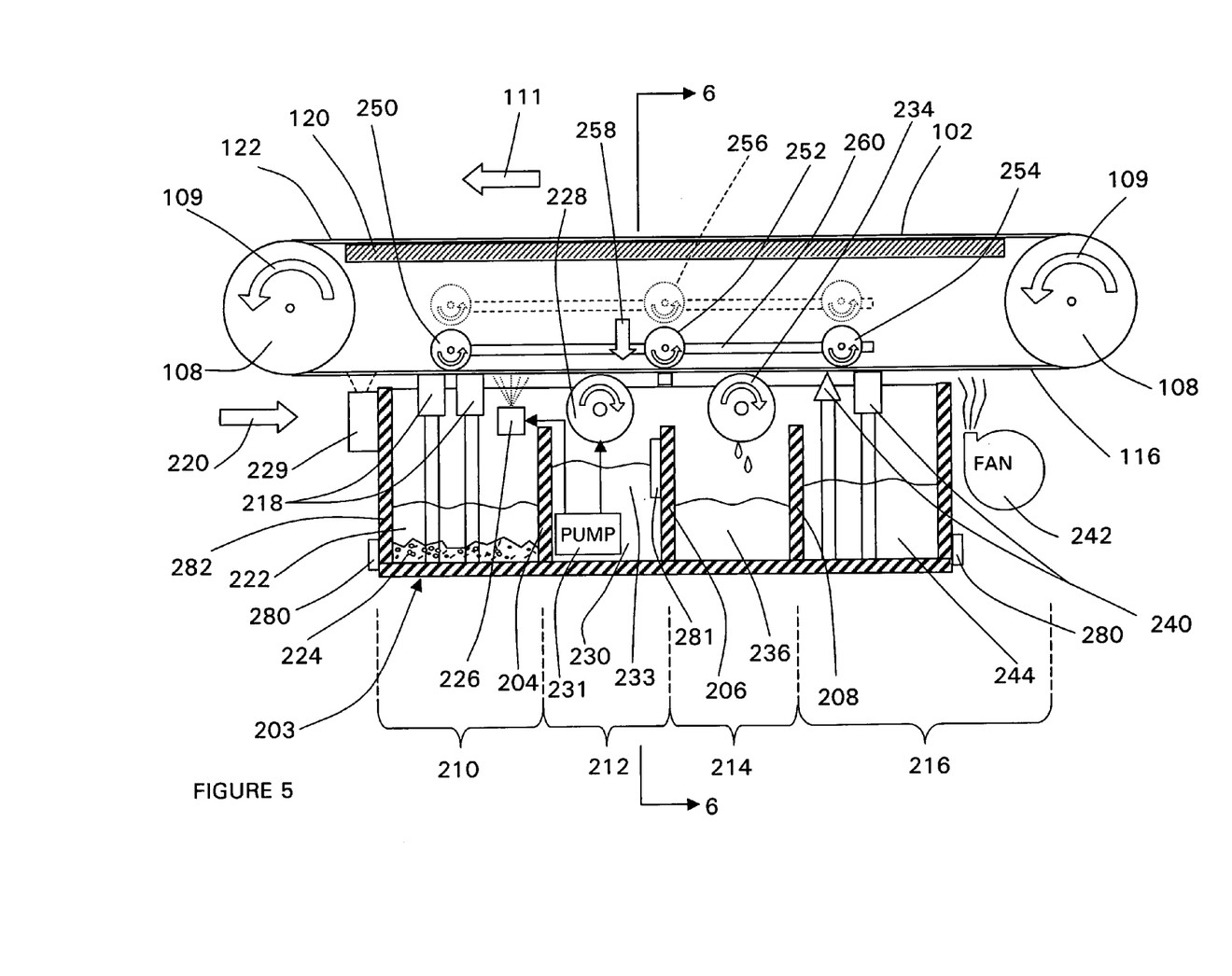
FIG. 5 is a cross-sectional view of the conveyor belt cleaning apparatus of the present invention as shown taken along line 5—5 of FIG. 3 and showing the drawer formed with four distinct stages, each with its own bin suited for capturing debris and for filling with suitable cleaning solutions, and an idler wheel positioned above the lower portion of the conveyor belt to maintain a contact force on the cleaning wheel and the rinsing wheel, as well as the debris removal stage, and drying stage.

Referring now to FIGS. 4 and 5, the conveyor belt cleaning apparatus 202 will be more fully described. FIG. 5 is a cross-sectional view of the conveyor belt cleaning apparatus 202 as shown in FIG. 3, and installed in place to clean and sterilize conveyor belt 102.

The debris-removal stage 210 of the conveyor belt cleaning apparatus 202 of the present invention includes one or more scraping devices 218 designed to forcibly remove any debris 118 that is on belt 102. These scraping devices 118 may be formed with a broad surface contacting the belt 102, or may be formed with a squeegee-like surface that scrapes along the belt 102 as it travels in direction 220.

These scraping devices 218 are designed to scrape food, fluids or other debris from the surface of the conveyor belt 102. The dislodged debris 224 falls into the corresponding bin 222 in the debris-removal stage 210 for collection and is removed at a later time.

Also in the debris removal stage 210, a cleaning solution sprayer 226 may be positioned to forcefully spray a cleaning solution onto the surface 116 of the conveyor belt 102 thereby further serving to remove debris from the belt. The sprayed cleaning fluid and any other debris may fall into the debris removal bin 222. The cleaning fluid 233 may be provided by a pump 231 positioned in a collection of cleaning fluid.

A debris detector 229 may be positioned to sense the presence of any debris on conveyor belt 102. As will be described in greater detail below, this debris detector 229 may determine the presence of debris on the belt 102, and initiate an automatic cleaning cycle of the conveyor belt 102. Alternatively, this detector 229 may provide a signal, such as a visual or audible signal, to the cashier informing him of the need to clean the conveyor belt.

As the conveyor belt 102 continuously advances, the now substantially debris-free surface 116 passes over a cleaning roller 228 that dispenses a cleaning solution onto the surface 116 of the belt. Excess cleaning solution falls it the corresponding cleaning roller bin 230, and may be re-used. Pump 231 may receive this cleaning solution and provide it as a sprayed cleaning solution After the conveyor belt passes over the cleaning roller 228, the conveyor belt 102 passes over the rinsing wheel 234 which is intended to remove all excess cleaning fluid, along with any remaining bacteria and debris, which drips into ringing roller bin 236. As the rinsing wheel 234 rolls along the conveyor belt 102, the fluid is pushed from the surface of the conveyor belt leaving a substantially water-free, yet damp surface 116.

Following the rinsing wheel 234 , a series of water removing devices 240, such as squeegees, are positioned in the final drying stage 216. These squeegees 240 may have different shapes, however, importantly provide a contact force on the surface 116 of the conveyor belt to squeegee water from its surface, resulting in water removed from the belt to collect in bin 244. Also in the drying stage, a fan 242 may be provided to create an air flow over the surface 116 of the belt 102 thereby expediting the drying process to make sure that the surface 116 of the conveyor belt is dry for use by a grocery store customer.

In order for conveyor belt cleaning apparatus 202 to most efficiently remove debris and clean a conveyor belt 102, it is advantageous to provide one or more idler wheels 250, 252, and 254 positioned adjacent the various stages of the device in order to maintain positive contact between the belt and the cleaning roller. For example, idler wheel 250 is positioned adjacent the scraping devices 218 in scraping stage 210 in order to make sure that all debris is successfully scraped from surface 116 of belt 102. Similarly, idler wheel 252 may be positioned between cleaning roller 228 and rinsing roller 234 serve to maintain positive contact between the two wheels 228 and 234 and the conveyor belt sufficient to clean and rinse the belt 102.

In order to maintain a constant contact between belt 102 and idler wheels 250, 252, and 254, each may be mounted to a bar 260 that may be raised to a position 256, and then lowered in direction 258 to a position adjacent belt 102. This may be done manually, or automatically with the use of mechanical, hydraulic, or pneumatic actuators that are known in the art.

As shown in FIG. 4, the chassis 203, or drawer, of the conveyor belt cleaning apparatus 202 of the present invention may be easily removed from the check stand 200 for servicing, and for draining and replacement of the cleaning fluids. This may be accomplished with drawer slides 280 mounted to sides 282 so that the present invention may be easily installed and removed from the checkstand 200.

In order to facilitate the cleaning, draining and refilling of the conveyor belt cleaning apparatus 202, chassis 203 may be formed drain nozzles 270, 272, and 274 suitable for draining the used fluids from the conveyor belt cleaning apparatus 202 without removal from the check stand 200. The conveyor belt cleaning apparatus may also be equipped with a fill nozzle 276 to allow for the addition of the cleaning fluids to the cleaning stage 230 bin.

Referring back to FIG. 3, canisters 296 and 298 may be provided in check stand 100. Canister 298 may contain a supply of cleaning solution and may be in fluid communication with the fill nozzle 276 in chassis 203 to manually or automatically, such as with the use of pump. Fluid level sensors may be used to determine when to add cleaning solution to fill nozzle 276 to maintain a sufficient volume of solution in bin 230.

Canister 296 may be in fluid communication with drain nozzles 270, 272, and 274 to receive used cleaning solution and debris removed from the conveyor belt thereby providing for longer intervals between the servicing of the conveyor belt cleaning apparatus of the present invention. These canisters 296, 298 may be easily filled and drained without having to disengage the present invention from the continuous conveyor belt 102.

Figure 6:
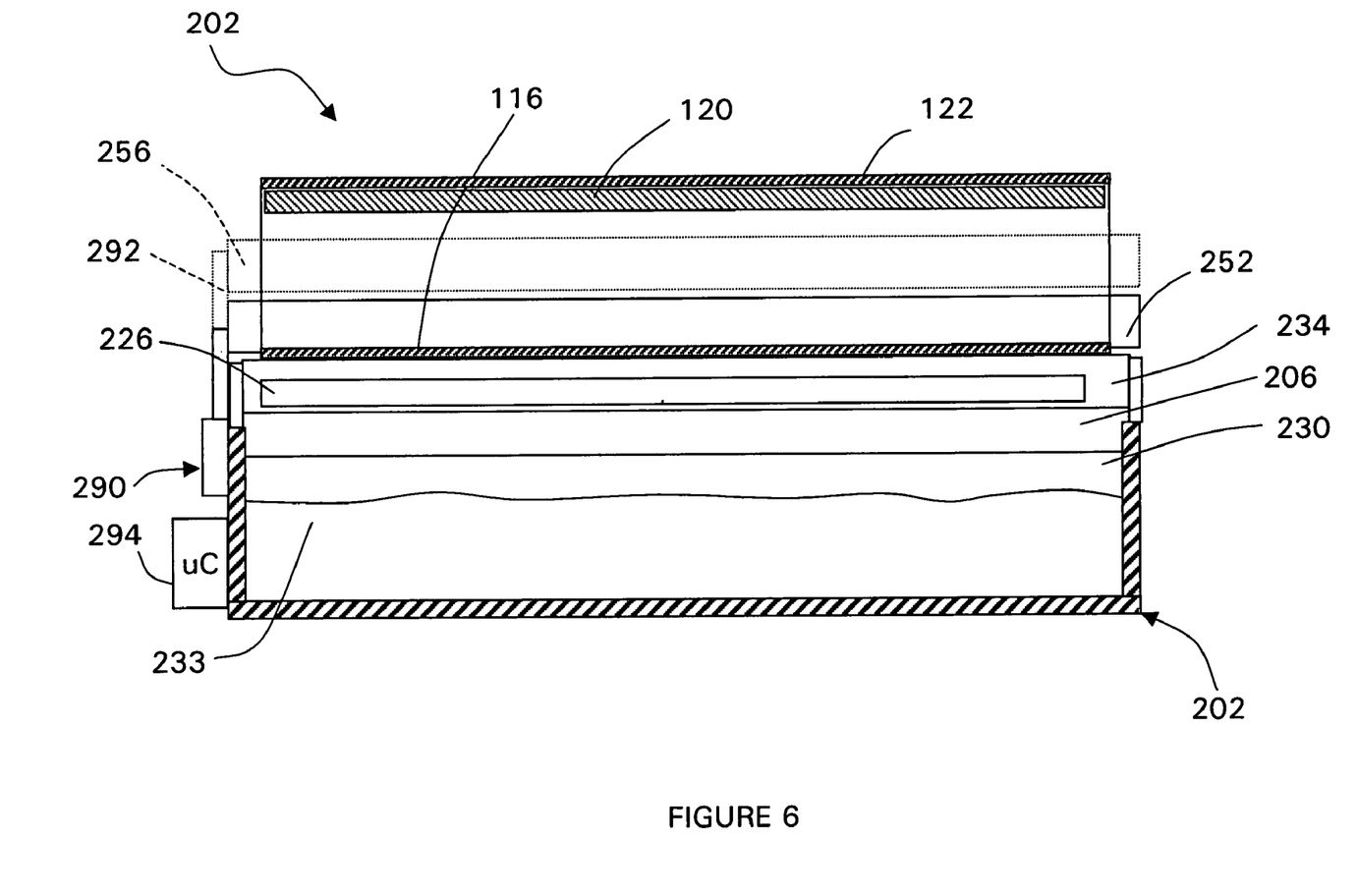
FIG. 6 is a cross-sectional view of the conveyor belt cleaning apparatus of the present invention as shown along line 6—6 of FIG. 5 showing the placement of the rinsing roller and the idler wheel urging the conveyor belt against the rinsing wheel to maintain a contact force thereby rinsing any cleaning solution from the conveyor belt.

In FIG. 6, the actuator 290 is shown and extends to a raised position 292 (shown in dashed lines) to allow for the raising of the idler wheels 250, 252 and 254 for removal of the device 202 from conveyor belt 102. Once in proper position adjacent the conveyor belt 102, the actuator 290 is activated to lower the idler wheels back to contact the conveyor belt.

In order to provide control to the operation of the conveyor belt cleaning apparatus 202 of the present invention, a digital control device 294, such as a microcontroller, microprocessor, programmable logic device, or other digital control apparatus, may be in electrical communication with the components of the present invention. This digital control device may include program memory, and may receive electronic input, such as signals from detector 229 and fluid level sensor 281, to control the operation of the device, such as the activation of pump 231 and actuator 290, for example.

Method of Operation

Figure 7:
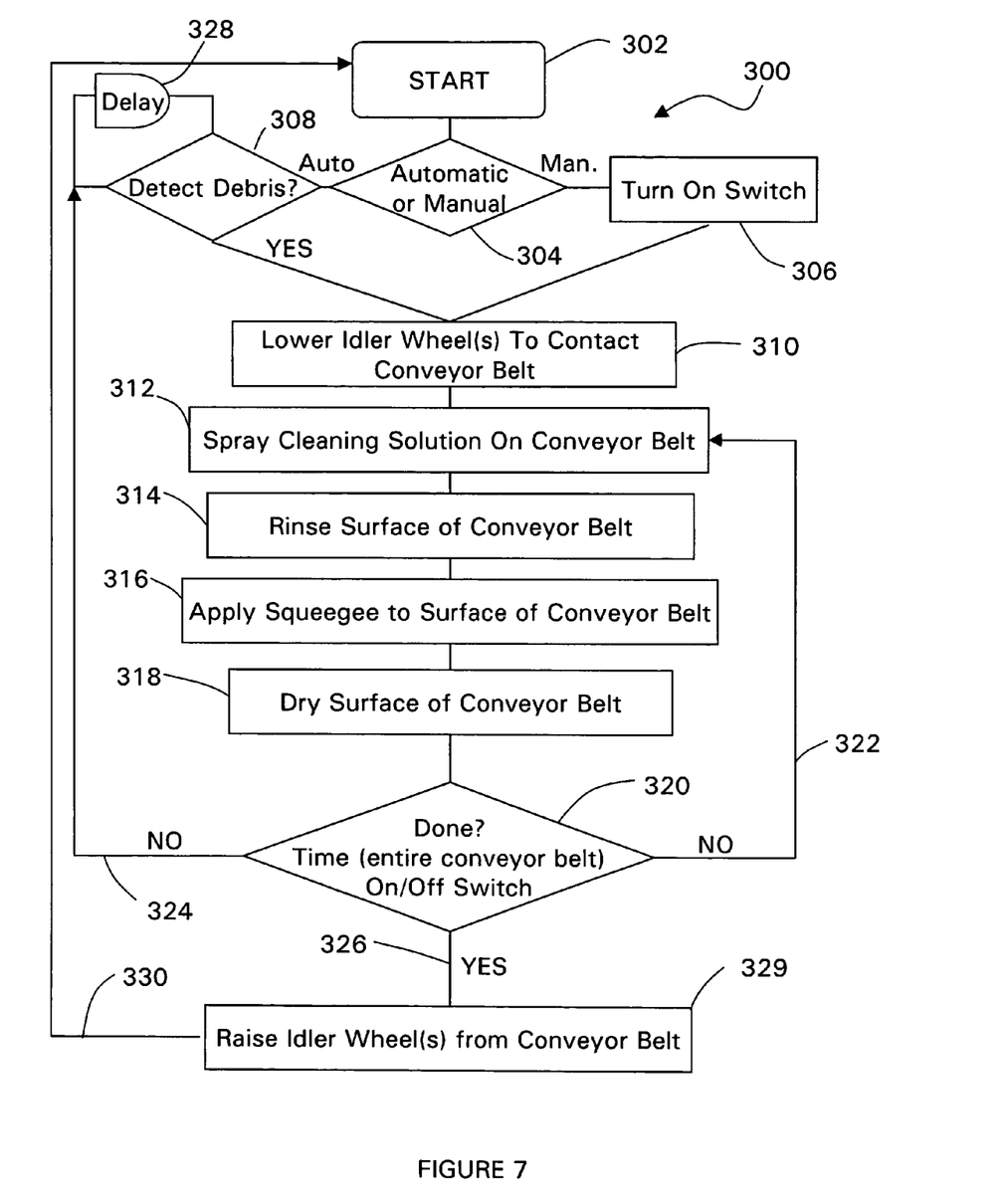
FIG. 7 is a flow chart showing the operation of the conveyor belt cleaning apparatus of the present invention in either an automated mode in which the apparatus periodically cleans the surface of the conveyor belt, or a manual mode in which the cashier may initiate the cleaning process by pressing a start button, or a debris-sensing detector may be incorporated to initiate and monitor the cleaning process.

The method and operation of the conveyor belt cleaning apparatus 202 of the present invention is outlined in FIG. 7. The flow chart 300 in FIG. 7 identifies a typical operational sequence for the initiation of a cleaning cycle, and for the options which exist during that cycle. More specifically, flow chart 300 includes an initial START step 302 identifying the initiation of the cleaning sequence. From step 302, it is determined from step 304 whether the apparatus will operate in an automatic or manual mode. If the manual mode is selected, the system will await the turning on of a manual switch in step 306. On the other hand, if an automatic mode is selected, the system will await the detection of debris on the belt, or it may initiate a cleaning sequence on a predetermined or preselected time interval in step 308.

Once a cleaning sequence is initiated, idler wheels are lowered to contact the conveyor belt in step 310 to urge the surface of the belt against the cleaning wheel, rinsing wheel, and other portions of the conveyor belt cleaning device. Once the belt is captured, a cleaning solution is sprayed on the conveyor belt in step 312. This spraying may be either a misting action intended to moisten any debris, or a forcible spray intended to dislodge any debris from the conveyor belt.

Also in step 312, a cleaning roller may apply additional cleaning solution to the surface of the conveyor belt. This roller may be supplied with a constant or intermittent supply of cleaning solution, or it may simply provide a physical cleaning action for cleaning solution already present on the surface of the conveyor belt.

In step 314, the surface of the conveyor belt is rinsed to remove at least a portion of the cleaning solution. This may be achieved by applying a pressure roller to the surface of the conveyor belt, or by providing a rinsing roller having absorbent qualities. A rinsing solution may be sprayed on the surface of the conveyor belt to provide additional rinsing action.

In step 316, one or more water-removing edges, such as a squeegee or rigid bar, may be provided to physically remove most remaining moisture and any remaining debris from the surface of the conveyor belt. In addition to the squeegee, a dryer, such as a fan or blower, may be implemented in step 318 to remove all remaining moisture from the conveyor belt.

In step 320, a determination is made to make certain that the cleaning process is complete. More specifically, in the event of a manual cleaning operation, the cleaning process will continue in return path 322 until the switch is turned off. Also, if the system is in the automatic cleaning mode, and the timer has not expired, control will continue in return path 324 until a delay 328 expires.

In the event that the cleaning process is complete, control passes along path 326 to raise the idler wheels in step 329, and the system returns via return path 330 to the start step 302.

In the automatic mode of step 308, the present invention may continuously monitor the surface of the conveyor belt to determine the presence of any debris. In the event debris is detected in step 308, the cleaning process starts in step 310. On the other hand, if no debris is detected, a delay may be observed in step 328 while the system 300 continuously monitors the surface of the conveyor belt. Then, once debris is detected, the cleaning process may continue in step 310.

While the process discussed in conjunction with method 300 is fully capable of achieving the objects of the present invention, the order of the process is not intended to be limiting as to the available sequence of events or activities. Rather, method 300 is merely exemplary of the process of a preferred embodiment, and no limitations are intended.

While the particular conveyor belt cleaning apparatus of the present invention as herein shown and disclosed in detail is fully capable of obtaining the objects and providing the advantages herein before stated, it is to be understood that it is merely illustrative of the presently preferred embodiments of the invention and that no limitations are intended to the details of use, construction or design herein shown other than as described in the appended claims.

I claim:

1. A conveyor belt cleaning apparatus for cleaning a continuous loop conveyor belt having a surface and within a check stand, comprising:
    a debris-removal stage;
    a washing stage;
    a rinsing stage;
    a drying stage;
    and a multi-chambered drawer and each of said stages is provided with an isolated bin within the drawer;
    wherein said surface of said continuous loop conveyor belt passes through said stages to remove any debris and bacteria.

2. The conveyor belt cleaning apparatus of claim 1, wherein the apparatus is capable of providing continuous or on-demand cleaning of a conveyor belt in order to remove any debris and fluids from the belt thereby providing a clean belt surface for use by a grocery store customer.

3. The conveyor belt cleaning apparatus of claim 1, wherein said debris-removal stage includes one or more scraping devices.

4. The conveyor belt cleaning apparatus of claim 3, wherein said scraping device is a squeegee.

5. The conveyor belt cleaning apparatus of claim 3, further comprising a cleaning solution sprayer positioned to forcefully spray a cleaning solution onto the surface of the conveyor belt.

6. The conveyor belt cleaning apparatus of claim 1, wherein said cleaning stage further comprises a cleaning roller that dispenses a cleaning solution onto the surface of the belt.

7. The conveyor belt cleaning apparatus of claim 6, further comprising an idler wheel positioned adjacent said cleaning roller to maintain positive contact between said belt and said cleaning roller.

8. The conveyor belt cleaning apparatus of claim 1, wherein said rinsing stage further comprises a rinsing wheel.

9. The conveyor belt cleaning apparatus of claim 8, wherein said rinsing wheel rolls along the conveyor belt and pushes fluid from the surface of the conveyor belt.

10. The conveyor belt cleaning apparatus of claim 1, wherein said drying stage further comprises one or more water removing squeegees positioned to contact the surface of the conveyor belt to squeegee water from its surface.

11. The conveyor belt cleaning apparatus of claim 1, wherein said drying stage further comprises a fan to provide an air flow over the surface of the belt thereby expediting the drying of the conveyor belt.

12. The conveyor belt cleaning apparatus of claim 1, wherein said drawer further comprises one or more drain nozzles suitable for draining the used fluids from the conveyor belt cleaning apparatus without removal from a check stand.

13. The conveyor belt cleaning apparatus of claim 1, wherein said drawer further comprises a fill nozzle to allow for the addition of the cleaning fluids to the cleaning stage bin.

14. A conveyor belt cleaning apparatus comprising:
a means for cleaning the surface of a conveyor belt;
a means for rinsing the surface of a conveyor belt;
a means for drying the surface of a conveyor belt, said means for drying comprising at least one squeegee in contact with said surface of the conveyor belt;
and a multi-chambered drawer and each of the means for cleaning, the means for rinsing, and the means for drying is provided with an isolated bin within the drawer.

15. The conveyor belt cleaning apparatus of claim 14, further comprising: a means for scraping the surface of a conveyor belt to remove debris therefrom.

16. The conveyor cleaning apparatus of claim 15, wherein said scraping device further comprises at least one squeegee.

17. A method of cleaning a continuous conveyor belt comprising:
providing a means for cleaning the surface of a conveyor belt;
providing a means for rinsing the surface of a conveyor belt;
providing a means for drying the surface of a conveyor belt, said means for drying comprising at least one squeegee in contact with said surface of the conveyor belt;
and providing a multi-chambered drawer means, wherein each of said means for cleaning, said means for rinsing, and said means for drying is provided with an isolated bin within the drawer means.

18. The method of claim 17, wherein said means for cleaning the surface of a conveyor belt further comprises at least one squeegee.

* * * * *